United States Patent [19]

Schweinfurth

[11] Patent Number: 5,147,674
[45] Date of Patent: Sep. 15, 1992

[54] METHOD FOR CONTINUOUSLY DECAFFEINATING RAW COFFEE

[75] Inventor: Hermann Schweinfurth, Bremen, Fed. Rep. of Germany

[73] Assignee: Jacobs Suchard AG, Fed. Rep. of Germany

[21] Appl. No.: 503,686

[22] Filed: Apr. 3, 1990

Related U.S. Application Data

[63] Continuation of Ser. No. 260,077, Oct. 20, 1988, Pat. No. 4,922,812.

[30] Foreign Application Priority Data

Oct. 21, 1987 [DE] Fed. Rep. of Germany ....... 3735636

[51] Int. Cl.$^5$ .............................................. A23F 5/16
[52] U.S. Cl. .................................. 426/427; 426/422; 426/507
[58] Field of Search ............... 426/422, 427, 428, 424, 426/384, 594, 507; 99/275, 467, 469, 485, 495, 496, 516, 534, 536, 289

[56] References Cited

U.S. PATENT DOCUMENTS 2,840,459 6/1958 Karnofsky .
3,108,876 10/1963 Turken et al. ....................... 426/427
3,671,263 6/1972 Patel et al. ........................... 426/428
4,474,821 10/1984 Morrison, Jr. et al. ............. 426/428
4,495,211 1/1985 Mooiweer .......................... 426/422

FOREIGN PATENT DOCUMENTS 78088 5/1983 European Pat. Off. .
111375 6/1984 European Pat. Off. .

*Primary Examiner*—Steven Weinstein
*Assistant Examiner*—Anthony Weier
*Attorney, Agent, or Firm*—Burns, Doane, Swecker & Mathis

[57] ABSTRACT

A device for continuously decaffeinating raw coffee includes a first extractor having at least one cell for use in a first treatment stage where raw coffee is preswollen by a swelling fluid that is added to the raw coffee. The at least one cell receives the raw coffee that is to be preswollen and is defined by a bottom and a plurality of sidewalls that extend towards one another to define a wedge-shaped cell. Additional similarly shaped cells and receiving chambers positioned below the cells may also be provided with a perforated bottom separating each cell from its respective receiving chamber.

15 Claims, 6 Drawing Sheets

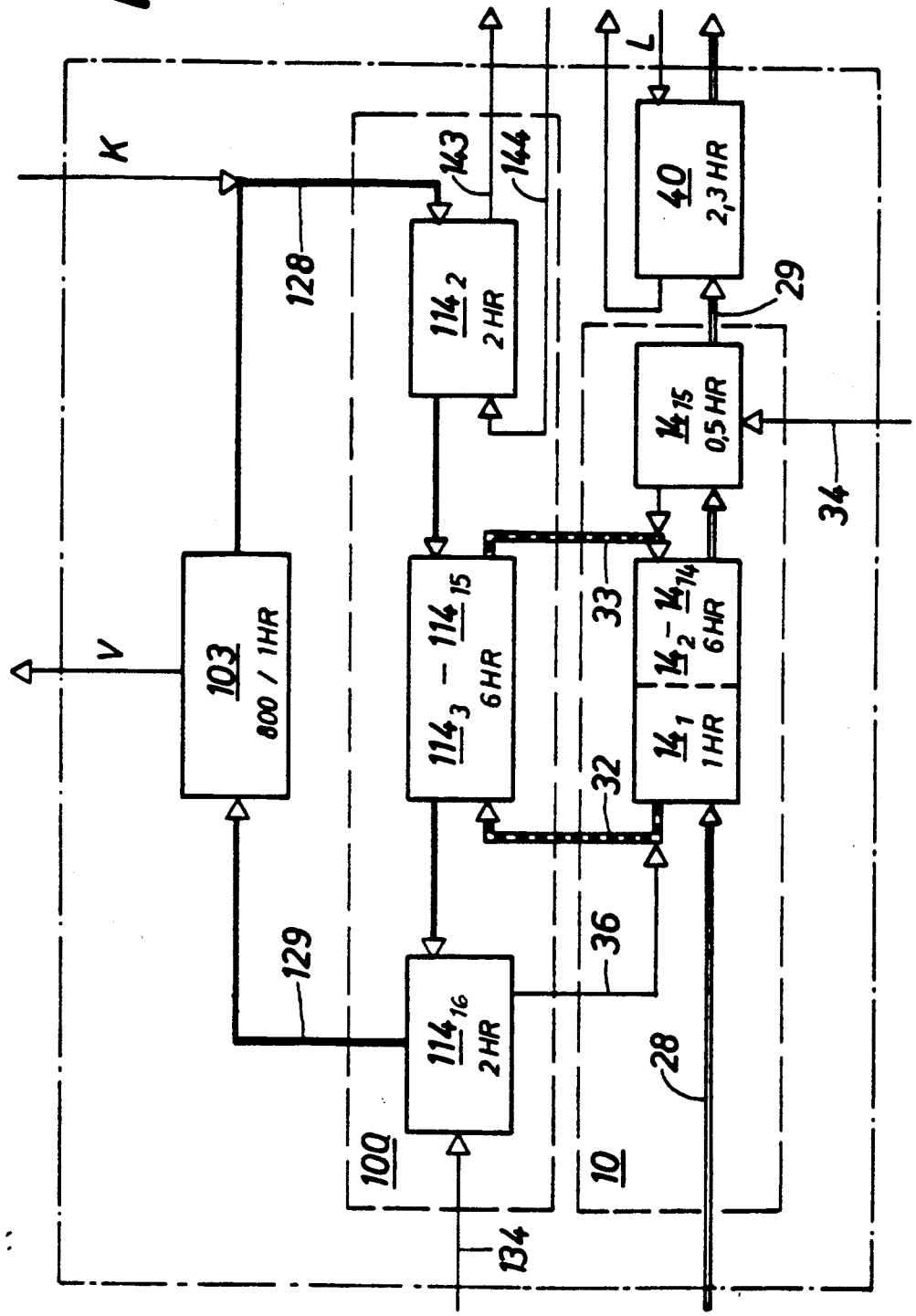

METHOD FOR CONTINUOUSLY DECAFFEINATING RAW COFFEE

This application is a continuation of application Ser. No. 07/260,077, filed Oct. 20, 1988, now U.S. Pat. No. 4,922,812, issued May 8, 1990.

FIELD OF THE INVENTION

The invention relates to a device for decaffeinating raw coffee and more particularly, to a device for continuously decaffeinating raw coffee that is subjected to various treatment stages.

BACKGROUND OF THE INVENTION

EP-8-0,008,398 has disclosed a process for decaffeinating coffee, wherein caffeine is extracted from raw coffee by an aqueous fluid. The extraction fluid is passed over a preloaded activated carbon adsorber, the caffeine being adsorbed.

Since the raw coffee delivered usually has a water content of 7 to 15 g of water/100 g of dry matter, it absorbs water in an aqueous fluid. During this swelling process, up to 160 g of water/100 g of dry matter (usually 130 g of water/100 g of dry matter) can be additionally absorbed by the raw coffee bean, the volume of the raw coffee bean being approximately doubled. In order then to avoid block of the column apparatus, which is used normally for taking the raw coffee beans, the dumped charge is kept moving during the swelling process by special measures (fluidizing with water or preswelling in a mechanical mixer). During this movement of the beans, however, fine particles are detached from the surface of the beans (silvery pellicle), which particles are carried along by the fluid and cause blockage in the downstream activated carbon adsorber.

SUMMARY OF THE INVENTION

Starting from the state of the art described above, it is the object of the present invention to demonstrate a simplified device of the type mentioned at the outset, wherein the raw coffee beans can be treated less robustly hitherto, that is to say while substantially at rest.

This object is achieved by a device of the type mentioned at the outset, which comprises, at least in the first treatment stage, for receiving the raw coffee which is to be preswollen, a container with a bottom and side walls, a substantial part of the side walls extending at a mutual angle, forming a conical container space.

Surprisingly, it has been found that, in this case, no blocking of the raw coffee beans takes place while they absorb water or their volume increases, even if the dumped charge is not moved. However, as a result of the fact that the raw coffee beans are at rest, there is no detaching of particles on the surface of the raw coffee beans, so that the adsorber is not blocked.

Preferably, the container in the first treatment stage is constructed as a sector-type cell of a rotary extractor which has a multiplicity of similar cells and a stationary slotted bottom. The achievement of the object stated above by a container of such construction, in which only two cell walls are at a mutual angle and form a container space which conically widens in the horizontal direction is particularly surprising and at the same time advantageous, since rotary extractors with containers of such construction are available.

In a rotary extractor, the individual cells with their contents are rotated over a stationary slotted bottom, which is interrupted by a sector-shaped section so that the cell contents can drop through downwards in this section and be removed. In the description which follows, the individual cells are defined with respect to their function, it having to be taken into account that each cell successively undertakes the various functions.

The first treatment stage, in which the raw coffee is preswollen, is followed by the actual extraction stage which extends over several extraction cells. A separate (stationary) receiving chamber is here allocated to each cell. The rotary extractor of this construction operates preferably as a continuous percolation apparatus by the crossflow/counterflow from this process. In the individual extraction stages, the extract concentration thus rises (viewed in the direction opposite to that of coffee transport), the preswelling stage at the same time representing a first extraction stage with maximum extract concentration and the extraction fluid being passed from this first stage to the adsorber.

Preferably, the adsorber is also constructed as a rotary extractor which not only contains the adsorption stages (operated by the crossflow/counterflow process), but in which the adsorbent is also preloaded before the adsorption stages and washed after the adsorption stages. As a result of this construction, it is particularly easy to synchronize the extraction device with the adsorption device.

BRIEF DESCRIPTION OF THE DRAWINGS

Further features essential to the invention can be seen from the following description of preferred embodiments of the invention, wherein like elements bear like reference numerals and wherein:

FIG. 8 is a block diagram of the processes which can be carried out using the arrangement according to FIG. 7.

DETAILED DESCRIPTION OF THE PREFERRED EMBODIMENTS

Figure 1:
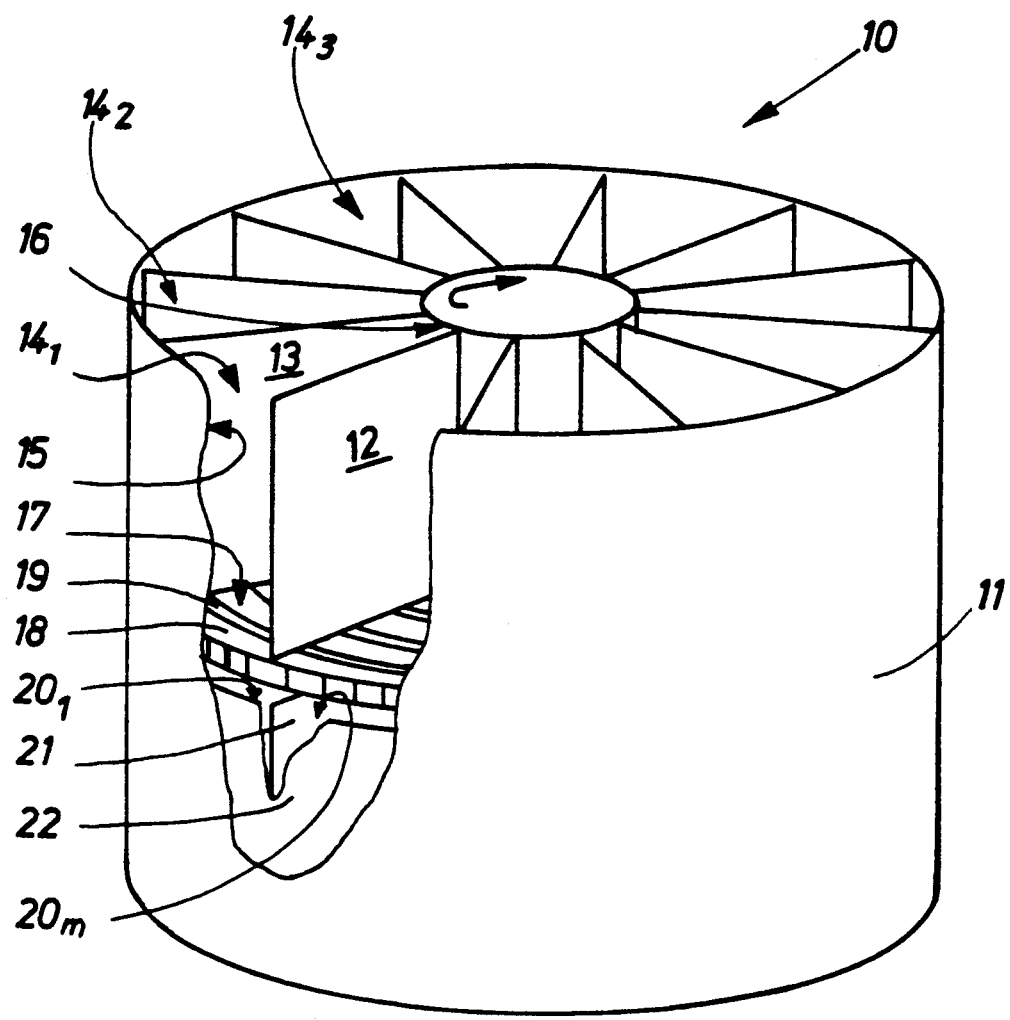
FIG. 1 is a first diagrammatic perspective representation of a first rotary extractor.

As can be seen from FIG. 1, a first rotary extractor 10 includes a housing 11, in which several cell walls are provided which extend radially from a common axis and of which only two cell walls are marked in FIG. 1 by the reference numbers 12 and 13. These first cell walls 12, 13 form diverging side walls of a first cell $14_1$ which, furthermore, is bounded by an outer wall 15 and an inner wall 16. The stationary bottom consists of bars 18 which are spaced apart by slots 19. The slotted bottom 17 formed in this way is thus fluid-permeable, the dimensions of the slots 19 being adapted to the material which is to be treated.

Receiving chambers $20_1$ to $20_m$ are provided below the stationary perforated bottom 17, $m$ corresponding to the total number of cells, The receiving chambers 20 are provided with partitions 21 and have a common outer wall 22.

For the sake of clarity, the housing 11 in the extractor 10 illustrated in FIG. 1 is shown as being open at the top, but preferably the housing is also closed at the top, so that the entire arrangement can be hermetically locked.

Figure 3:
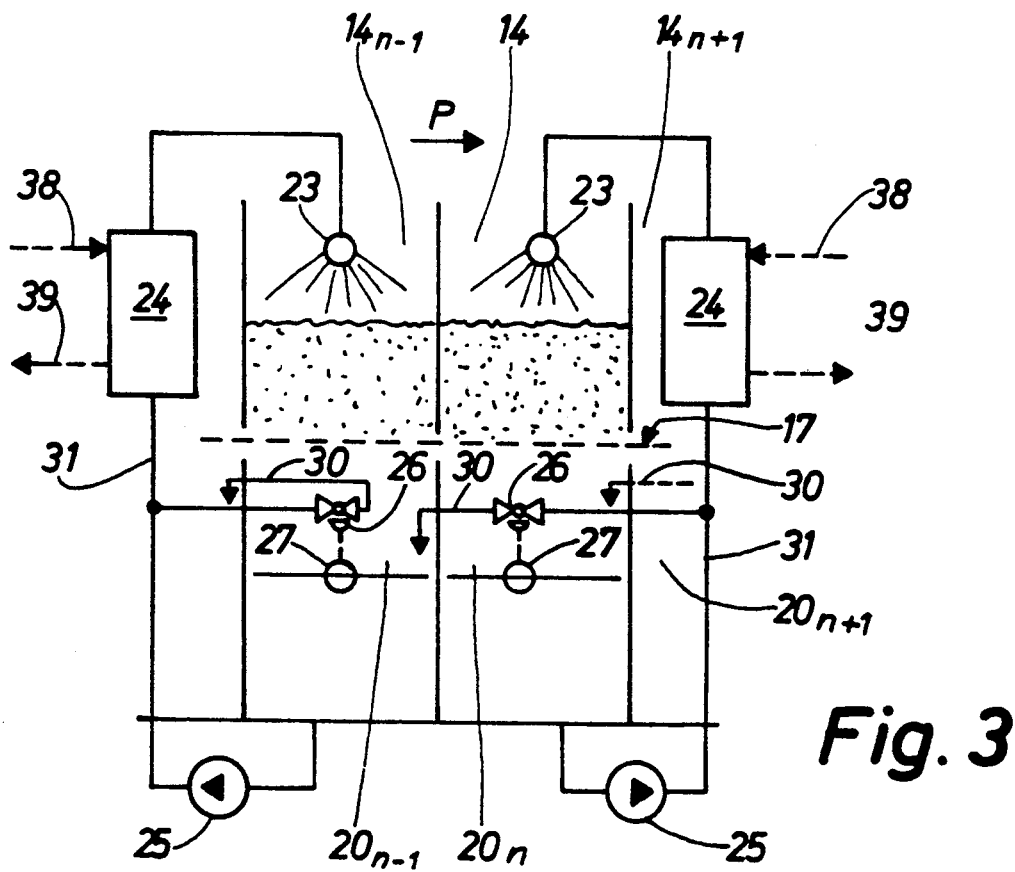
FIG. 3 is a block diagram of two extraction treatment stages of the rotary extractor according to FIG. 1.
Figure 4:
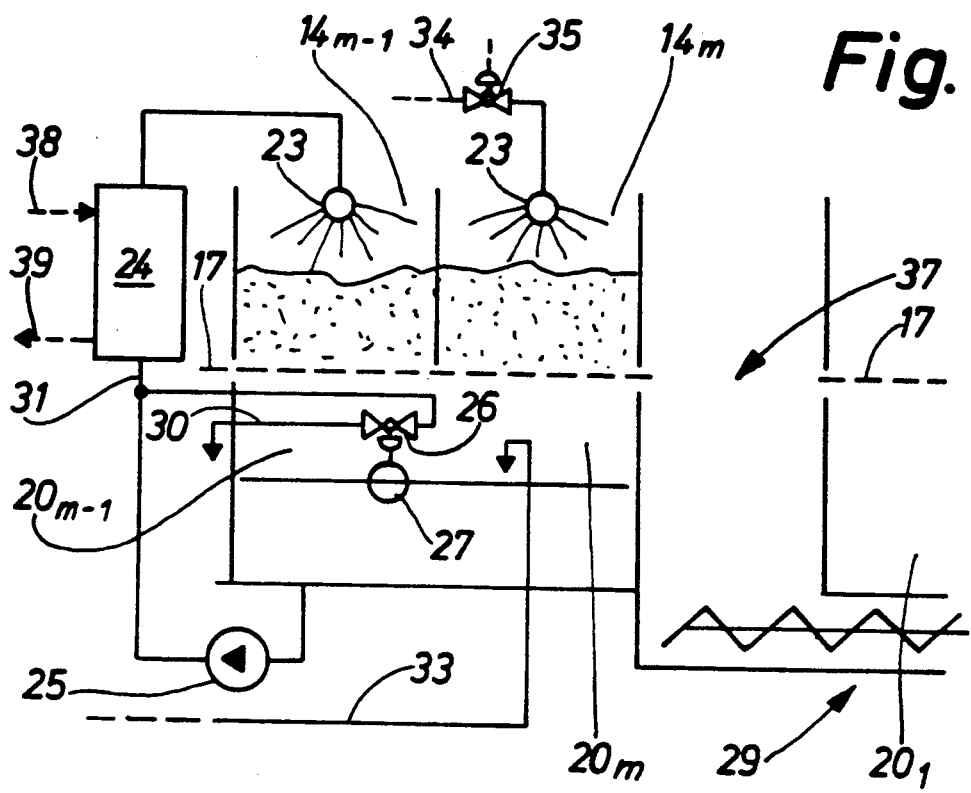
FIG. 4 is the last treatment stages and discharge stage of the rotary extractor according to FIG. 1.

A diagrammatic representation of the structure and mode of action of the rotary extractor 10 according to FIG. 1 is given below by reference to FIGS. 2 to 4. The illustrations here show an instantaneous representation of an operational state with cells at rest, the cells being moved forward in a defined cycle by one chamber width or cell width each time.

Figure 2:
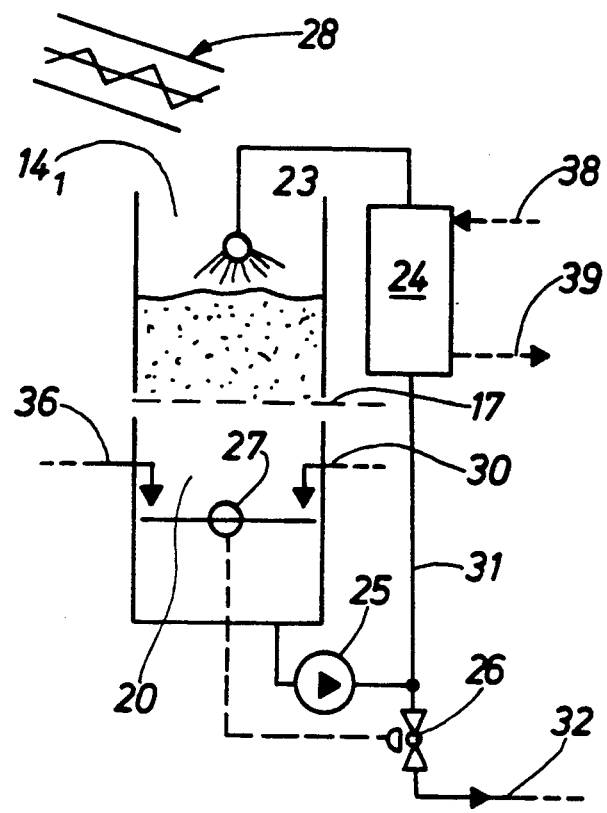
FIG. 2 is a block diagram of the first treatment stage of the rotary extractor according to FIG. 1.

In FIG. 2, the first cell $14_1$ is shown diagrammatically, with a feedscrew 28 ending above it. Below the perforated bottom 17 of the first cell $14_1$, there is the first receiving chamber $20_1$, so that fluid dripping through the perforated bottom 17 can pass exclusively into this receiving chamber and not into adjacent receiving chambers.

The receiving chamber $20_1$ communicates at its bottom with a suction branch of a pump 25, the delivery branch of which is taken via a line 31 through a heat exchanger 24 to a spray head 23 which is located above the cell $14_1$. The heat exchanger 24 is connected to a heating steam line 38 and a condensate line 39 and is constructed such that fluid withdrawn from the chamber $20_1$ is heated to a defined temperature (preferably 80° C.) before it emerges from the spray head 23.

A counterflow line 30 and a swelling water line 36, which are described in more detail below, lead into the chamber $20_1$. A float 27, which controls a valve 26 between the outlet of the pump 25 and a caffeine extract line 32 in such a way that a defined level in the chamber $20_1$ can be adjusted, is additionally provided in the chamber $20_1$.

The cell $14_1$, shown in FIG. 2, with chamber $20_1$ is adjoined by several extraction cells with receiving chambers located below, of which only two are fully shown in FIG. 3. With respect to the wetting devices, consisting of pumps 25, lines 31, heat exchangers 24 and spray heads 23, these extraction cells are essentially identical to the wetting device for the first cell but the valve 26 which is controlled by the float 27 and one inlet of which communicates with the delivery branch of the pump 25, is connected by its other outlet to a counterflow line 30 which thus ends in the chamber $20_{n-1}$ at the valve 26 associated with the chamber $20_n$. Accordingly, the countercurrent line 30 of the chamber $20_{n+1}$ leads into the chamber $20_n$, and so on. The countercurrent line 30 shown in FIG. 2 thus carries fluid which originates from the chamber $20_2$. This arrangement produces a fluid flow which, on the one hand, represents a crossflow via the working device and, on the other hand, comprises a countercurrent in the direction opposite to that in which the cells 14 are transported (arrow P in FIG. 3).

Downstream of the last extraction cell $14_{m-1}$ with a setting device constructed as described before, there is a washing cell $14_m$, above which a spray head 23 is arranged which is connected via a valve 35 to a washing water line 34. The chamber $20_{m-1}$ of the last extraction cell merges directly (without a partition) into the chamber $20_m$ of the washing cell. A caffeine-free extract line 33, the connection of which is described in detail below, leads into this double chamber.

After the washing cell $14_m$, the bottom 17 has a discharge cut-out 37 so that, when the cells are transported further, the cell content can drop down through this cut-out 37 into a discharge 29 and be removed by the discharge screw provided there.

The abovementioned caffeine extract line 32 (FIG. 2) is connected to an inlet of the adsorber, in which caffeine contained in the fluid flowing in, is adsorbed, so that caffeine-free fluid passes from the adsorber (described in more detail below) into the caffeine-free extract line and from there into the last double chamber.

The cell extractor is preferably constructed in such a way that the side walls 12, 13 (see FIG. 1) of each cell are at a mutual angle of at least 20°. The feed device 28 is constructed in such a way that, when raw coffee is filled in, the first stage can be filled with such a quantity that the dumped charge reaches up to a height which essentially corresponds to the external width of the sector.

In detail, the process proceeds as follows. During the cycle time which (preferably) is one hour, the cell walls forming a rotor are at a standstill and all pumps 25 are running. The raw coffee present in the washing cell $14_m$ is sprayed with fresh water which passes into the receiving chamber located below, to which the extract, which is anyway free of caffeine, from the adsorber is fed via the line 33. Because of the preloading of the adsorbent, the caffeine-free extract contains substantially all the water-soluble constituents of the raw coffee, except for caffeine.

As a result of the additions of fluid (washing water, caffeine-free extract), the fluid level in the last double chamber rises up to a level at which the valve 26 is open by the float 27 and fluid is delivered from the double chamber via the pump 25, associated with the latter, into the receiving chamber located in front. At the same time, the fluid present in the chamber is passed, via the pump 25 (with simultaneous heating to about 80° C.) to the spray head 23 to form a crossflow and runs through the quantity of raw coffee present in the chamber $14_{m-1}$. With respect to its delivery rate, the pump 25 is here controlled in such a way that the spraying rate of recirculation rate is lower than the maximum percolation rate (flooding rate).

The result of the level controls in the receiving chambers, associated with the extraction cells located upstream is a fluid flow, the fluid having a caffeine concentration which rises from chamber to chamber. In the first receiving chamber $20_1$ (FIG. 2), there is thus an extraction solution of maximum caffeine content, the fluid level in the first chamber $20_1$ being kept constant by the valve 26 controlled by the float 27, since, at rising level, an extract rate corresponding to the fluid rate fed is passed via the line 32 to the adsorber and returns from the latter back into the receiving chamber associated with the last extraction cell.

Just before the end of the cycle time, all the pumps 25 are switched off and the level control in the receiving chambers is put out of action. Thus, the total fluid quantity in each stage is collected in the particular receiving chamber. After the fluid has dripped off, which takes an adjustable time, the drive of the extractor is switched on again and the cells are moved forward by one chamber. During the standstill time of the pumps 25, the valve 35 for controlling the washing water feed is turned off, while the fluid flow through the adsorber can be maintained. When the cells have reached their new position, all the pumps 25 are switched on again, the level control initially being kept inactive. After expiration of a time set by a control unit not shown in more detail, the level control is reactivated. Furthermore, after the cells have reached their new position, the first cell is filled—as described at the outset—with a fixed quantity of raw coffee. In addition, the heating steam lines 38 are isolated during the standstill time of the pumps 25.

Figure 5:
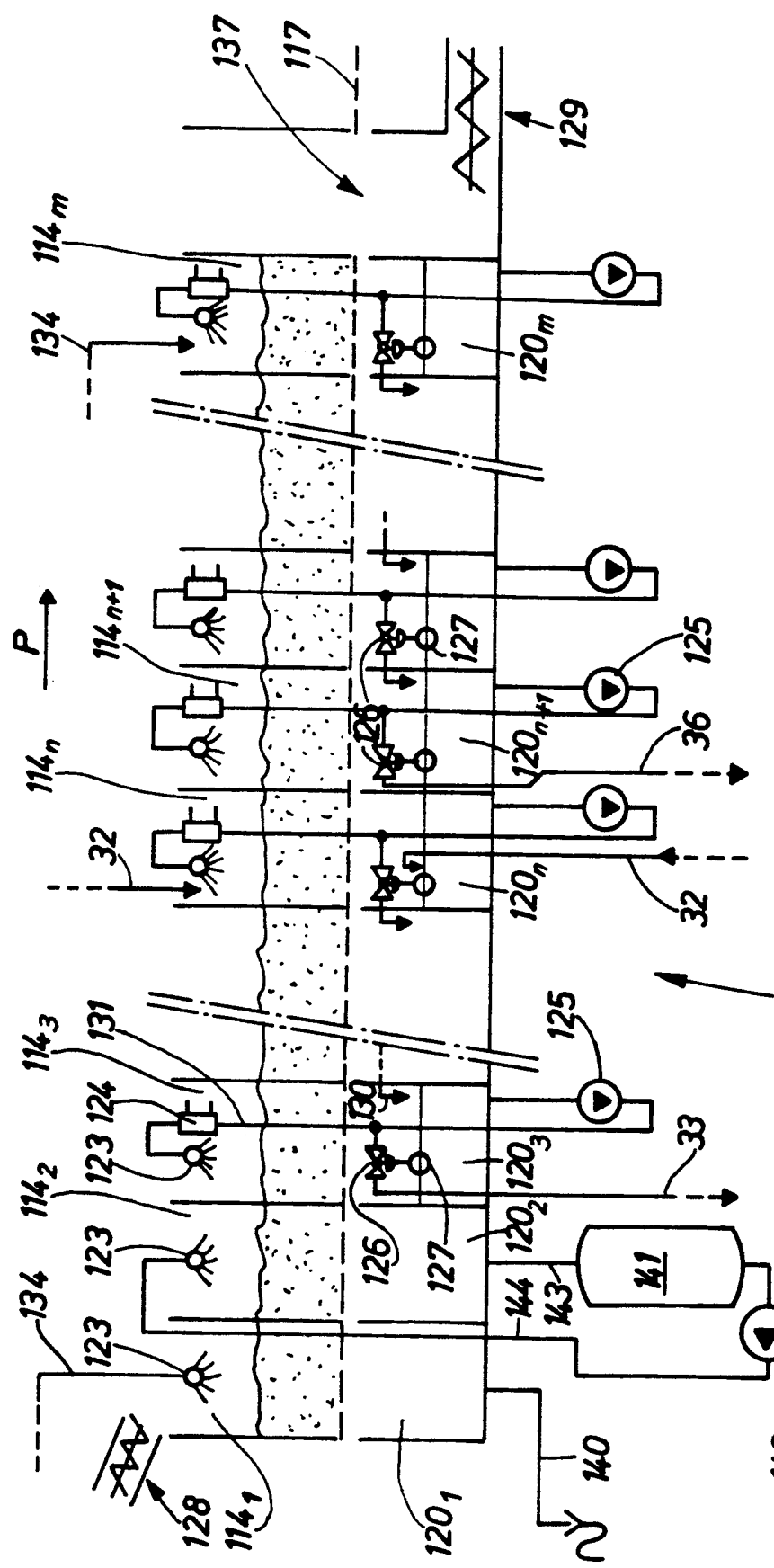
FIG. 5 is a diagrammatic block diagram of a rotary adsorber.

The adsorber, which is located between the lines 32 and 33, is described in more detail below by reference to FIG. 5.

The adsorber comprises a second rotary extractor 100, above whose first cell $114_1$ in inlet 128 is arranged, through which adsorbent (activated carbon) can be fed in. The receiving chamber $120_1$ located below the first cell $114_1$ is connected via an outflow line 140 to an outflow, so that washing water, which is sprayed via a line 134 and the spray head 123 from above onto the adsorbent which has been filled in, can be discarded directly.

The cell $114_2$, which follows the filling/washing cell $114_1$, is connected, together with its associated receiving chamber $120_2$, to a preparation/regeneration tank 141, the outlet lein of which is located at the suction connection of a lading pump 142, by means of which the adsorbent is sprayed by means of the spray head 123 with preloading fluid from the tank 141. The ingredients of the fluid used for preloading are described in more detail in the European Patent which was cited at the outset and which is herewith incorporated by reference. In any case, the fluid is adjusted in such a way that the purified activated carbon, fed via the feeder 128, is preloaded with the ingredients, or substances identical to the ingredients, which are not to be extracted from the coffee beans, so that the caffeine is adsorbed selectively on the adsorbent.

The preloading cell $114_2$ is followed by a first adsorption cell $114_3$ which is connected in countercurrent to the subsequent adsorption cells (up to $114_n$), the levels of the receiving chambers $120_3$ to $120_n$ having level control devices (float 127, valve 126, countercurrent line 130) and spraying devices (pump 125, crossflow line 131, heat exchanger 124, spray head 123) to form a crossflow/countercurrent. The arrangements are thus similar to those of the extraction cells of the first rotary extractor 10.

The caffeine extract line 32 from the receiving chamber $14_1$ of the first rotary extractor 10 leads into the receiving chamber $120_n$ of the last extraction cell $114_n$. The valve 126, controlled by the float 127, of the first receiving chamber $120_3$ of the first adsorption cell $114_3$ controls the volumetric flow, taken via line 33 from the first chamber $120_3$, of caffeine-free extract, which is fed to the double chamber of the last extraction cell $14_{m-1}$. The adsorption cells $114_3$ to $114_n$ are adjoined by one or more washing cells $114_{n+1}$ to $114_m$ which carry a crossflow/countercurrent flow in the same way as described above, fresh wash being charged by a washing water line 134 to the last washing cell $114_m$ and fluid being pumped via the level control of the first washing cell $114_{n+1}$ into the line 36. This fluid is fed via the line 36 to the first (swelling) cell $14_1$ or its chamber $20_1$.

Downstream of the last washing cell $114_m$, the perforated bottom 117 of the second rotary extractor 100 is provided with a discharge cut-out 137, through which the adsorbent contained in this cell can drop down to a discharge screw 129.

The discharger 129 conveys the (washed) adsorbent to an oven which is not shown here in more detail and in which the activated carbon is reactivated at about 800° C., the substances adsorbed on the activated carbon being vapourized and being burned in a downstream burner. In addition, carbon dust is removed. Finally, a quantity of fresh activated carbon equivalent to the dust removed is added, so that the quantity of adsorbent in circulation remains constant.

Figure 6:
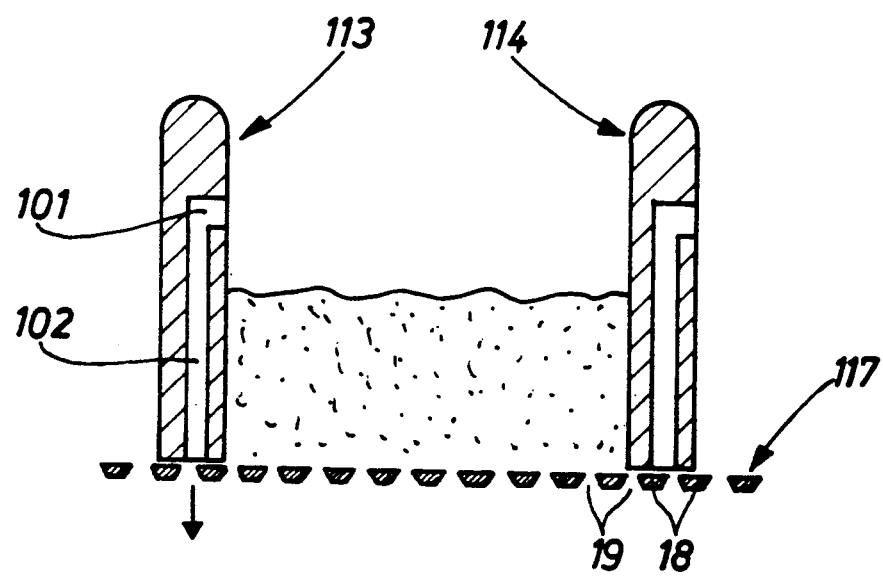
FIG. 6 is a diagrammatic vertical section through a treatment stage of the rotary adsorber according to FIG. 5.

FIG. 6 shows a diagrammatic longitudinal section of a cell of the adsorber 100. In these cells, ports 101, which lead via conduits 102 right down to the perforated bottom 117, are made in the side walls 113, 114. The ports 101 serve as overflow ports which pass that fluid quantity, which is delivered by the pumps 125 in excess of the percolation rate, directly down into the particular receiving chamber located below. In this way, the cells can be operated in the flooded state.

Figure 7:
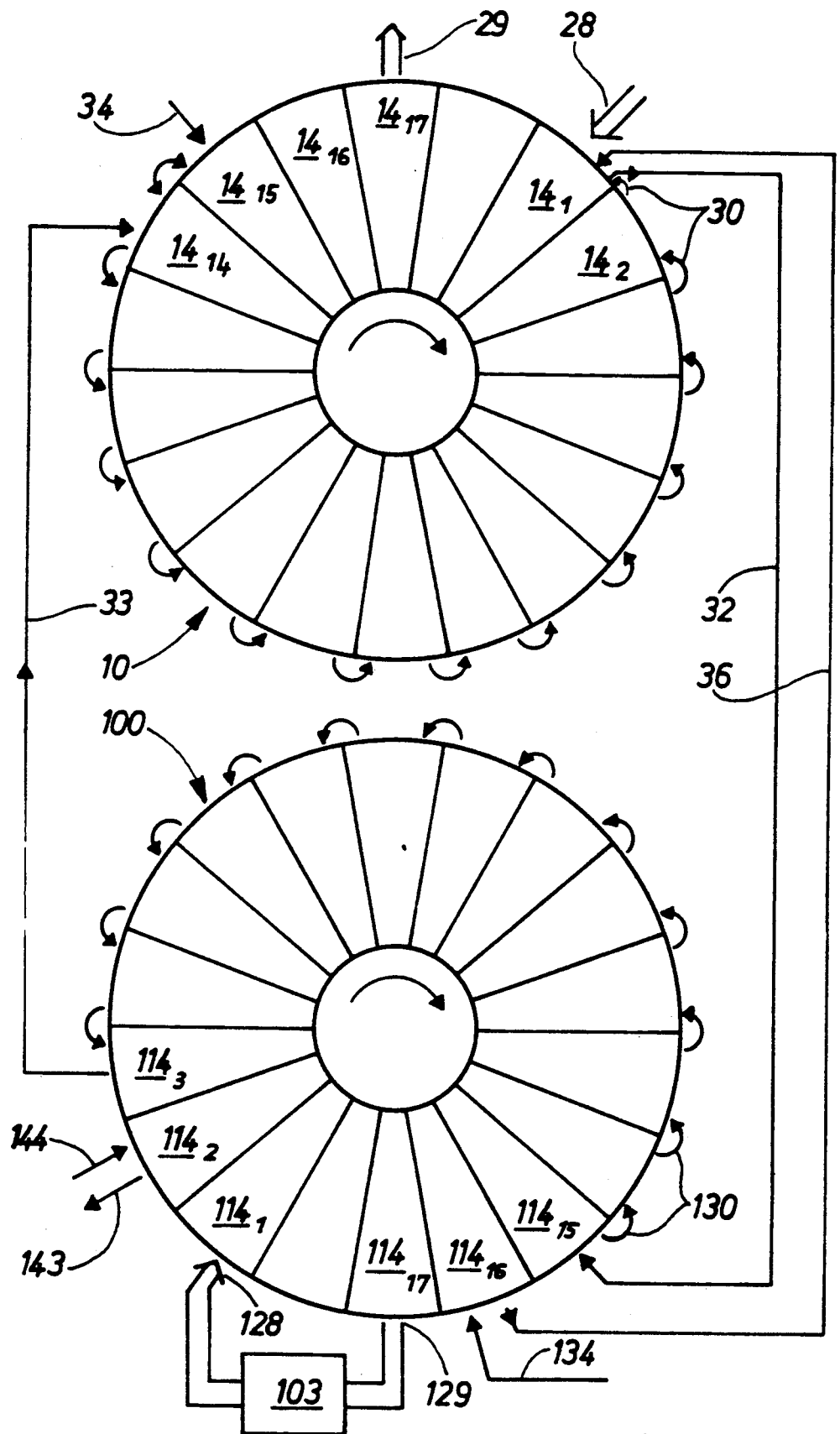
FIG. 7 is a diagrammatic representation of the linkage between the rotary extractor and rotary extractor and rotary adsorber.

The overall process is described in more detail below by reference to FIGS. 7 and 8. Where "cells" are mentioned in this description, this expression also comprises at the same time the receiving chamber located below.

The rotary extractor 10 and the rotary adsorber 100 have the same number of cells and are operated in synchronized motion. Raw coffee via the feeder 28 and loaded washing water from a (single) washing cell $114_{16}$ of the rotary adsorber 100 to the first cell $14_1$ of the first rotary extractor 10. In addition, caffeine-loaded extract from the subsequent extraction cells $14_2$ passes via the countercurrent lines into the first cell $14_1$. Caffeine-rich extract is pumped from the cell $14_1$ via the line 32 into the last adsorption cell $114_{15}$ of the adsorber 100, the rate corresponding to the fluid flows through the counter-current line 30 and the swelling water line 36 minus the quantity of fluid absorbed by the coffee beans on swelling. In the subsequent extraction cells $14_2$ to $14_{14}$, the caffeine content of the coffee beans falls until it reaches its minimum in the last extraction cell $14_{14}$. Caffeine-free extract pumped out of the first adsorption cell $114_3$ of the adsorber 100 is fed via the line 33 to this last extraction cell $14_{14}$. After the last extraction cell $14_{14}$, the cell content of the cell $14_{15}$ is sprayed with washing water via a line 34, a dripping-off cell $14_{16}$ also being provided downstream of this washing cell $14_{15}$ in the arrangement shown in FIG. 7. After dripping-off, the cell content in a discharge cell $14_{17}$ is passed to the discharge 29, the (decaffeinated) coffee discharge there then being dried in a dryer 40 by feeding air (L) as shown in FIG. 8.

In the absorber 100, a washing cell $114_{16}$, in which the adsorbent is sprayed via a washing water feed from a washing water line 134, is provided upstream (as viewed in the direction of transport of the adsorbent) of the last adsorption cell $114_{15}$. The substances not bound to the adsorbent are thus floated off, this fluid being used via the line 36 as swelling fluid.

Downstream of the washing cell $114_{16}$, the adsorbent in a discharge cell $114_{17}$ is passed via a discharge 129 to the reactivator 103, from which the regenerated reactivated carbon is passed via a feeder 128 to the first cell $114_1$ of the adsorber 100. In the next cell $114_2$, the activated carbon is preloaded, namely by spraying with a preloading fluid (lines 143, 144).

As shown by FIG. 8, the adsorbent is thus in a circulation which is "disturbed" only by the removal of carbon dust (arrow V) and the addition of fresh activated carbon (arrow K).

The drive of the rotary extractor 10 and of the adsorber 100, and their cell numbers, are chosen such that the adsorbent, which has been free of loading substances in the reactivator 103 for a period of about one hour, is preloaded for a period of about two hours, before it is used for a period of about six hours for adsorbing caffeine in the cells $114_3$ to $114_{15}$. After the adsorption, the adsorbent is washed for a period of about two hours before it is regenerated once more.

The raw coffee fed to the rotary extractor via the feeder 28 is preswollen for a period of about one hour in the first cell $14_1$ and then passes within a period of about six hours through extraction cells $14_2$ to $14_{14}$. The decaffeinated raw coffee coming from the extraction cells is washed for a period of about 0.5 hours in the cell $14_{15}$ and then drips off for a further 0.5 hours. After dripping-off, the decaffeinated raw coffee is then dried in a dryer 40 for a period of about 2.3 hours by feeding (warmed) air.

EXAMPLE

A rotary extractor having a total of 12 cells (segment angle 30°), an external diameter of about 1 m and an internal diameter of bout 0.45 m was filled with 8.7 kg of dry raw coffee per cell. In the dry state, the width-/height ratio was here 0.19 m/0.21 m. The beans were sprayed with raw coffee extract having an extract concentration of about 14% at a flow rate which was lower than the flooding rate. The raw coffee was here swollen at 80° C. within one hour, without a blockage of the charge occuring.

I claim:

1. A method of decaffeinating raw coffee, comprising the steps of:
    placing raw coffee in a wedge-shaped extractor cell of an extractor, said wedge-shaped cell being defined by a bottom, an outer wall and two side walls which converge towards one another at an acute angle of at least 20°;
    preswelling the raw coffee during a preswelling stage by adding a fluid for preswelling to the raw coffee in the extractor cell without substantially moving the extractor cell and the raw coffee;
    collecting the fluid in a first receiving chamber which is located below and aligned with the extractor cell after the fluid has passed through the raw coffee and the bottom; and
    moving said extractor cell to an extractor stage in which said extractor cell is aligned with an extraction receiving chamber positioned below said bottom, and wetting the coffee in the extractor cell that has been preswollen in order to extract caffeine.

2. The method according to claim 1, including the steps of successively moving said extractor cell relative to said bottom to a series of extraction stages in which said extractor cell is successively aligned with successive extraction receiving chambers located below the bottom, and wetting the coffee in the extractor cell that has been preswollen with a fluid during each of the extraction stages.

3. The method according to claim 2, wherein fluid is collected in the extractor receiving chambers, and including the step of returning at least some of the collected fluid in each respective extractor receiving chamber to the extractor cell when the extractor cell is aligned with the respective extractor receiving chamber, and wetting the coffee located in the extractor cell that has been preswollen with the returned fluid.

4. The method according to claim 2, including the steps of collecting caffeine-rich fluid in each of the extraction receiving chambers associated with each of the extraction stages, and feeding at least a portion of the caffeine-rich fluid in each extraction receiving chamber to a preceding extractor receiving chamber located upstream therefrom with respect to the direction of movement of the extractor cell so that a first one of said extractor receiving chambers located adjacent said preswelling stage contains caffeine-rich extract having substantially the greatest content of the caffeine while the extraction receiving chambers located successively farther downstream from the first extractor receiving chamber with respect to the direction of movement of the extractor cell contain caffeine-rich extract having successively lesser amounts of caffeine.

5. The method according to claim 4, including the step of feeding at least some of the caffeine-rich extract in the first extractor receiving chamber to an adsorber for adsorbing the caffeine, said adsorber having a plurality of serially arranged adsorber cells movably positioned above a bottom and a plurality of serially arranged adsorber receiving chambers positioned below the perforated bottom.

6. The method according to claim 5, including the steps of aligning a first one of the adsorber cells with a first one of the adsorber receiving chambers, feeding adsorbent to the first adsorber cell, and washing the adsorbent in the first adsorber cell with a fluid.

7. The method according to claim 6, including the steps of moving said first adsorber cell to a position in substantial alignment with a second absorber receiving chamber, and spraying the adsorbent in the first absorber cell with a preloading fluid to preload the adsorbent.

8. The method according to claim 7, including the steps of successively moving the first adsorber cell into alignment with successive ones of a plurality of third adsorber receiving chambers located downstream from the second adsorber receiving chamber with respect to the direction of movement of the first adsorber cell, wherein said step of feeding at least some of the caffeine-rich extract in the first extractor receiving chamber to an adsorber includes feeding the caffeine-rich extract to a last one of said third receiving chambers and feeding at least some of said caffeine-rich extract in said last third adsorber receiving chamber in said adsorber to the adsorber cell positioned above said last third adsorber receiving chamber to adsorb some of the caffeine in the caffeine-rich extract.

9. The method according to claim 8, including the steps of feeding at least some of the fluid in the last third adsorber receiving chamber to a preceding third adsorber receiving chamber in the adsorber which is positioned upstream therefrom with respect to the direction of movement of the adsorber cells, and feeding at least some of the fluid in each of the respective third adsorber receiving chambers to the first adsorber cell when the first adsorber cell is positioned thereabove, the fluid in the third adsorber receiving chamber located adjacent said second adsorber receiving chamber being substantially free of caffeine.

10. The method according to claim 9, including the steps of feeding the substantially caffeine-free fluid in the third adsorber receiving chamber located adjacent the second adsorber receiving chamber to the extractor receiving chamber located farthest downstream from the first extractor receiving chamber with respect to the direction of movement of the extractor cells.

11. A method of using a revolving extractor for preswelling raw coffee, wherein the extractor includes at least one wedge-shaped extractor cell defined by a bottom, an outer wall and a plurality of side walls which converge towards one another at an acute angle of at least 20°, comprising:
   placing raw coffee in the wedge-shaped extractor cell; and
   spraying the raw coffee with a preswelling fluid to preswell the raw coffee while maintaining the raw coffee at rest.

12. The method according to claim 11, wherein the extractor includes a plurality of extractor receiving chambers positioned below the at least one extractor cell, the method including the steps of rotating the at least one extractor cell into successive alignment with individual ones of said extractor receiving chambers, wetting the raw coffee to extract caffeine from the raw coffee and thereby produce a caffeine-rich fluid, and collecting the caffeine-rich fluid in the extractor receiving chamber with which the at least one cell is aligned.

13. A method of using a device for decaffeinating raw coffee, said device including a rotary extractor having at least one extractor cell positioned above a plurality of adjacently arranged extractor receiving chambers, said at least one extractor cell having a bottom, an outer wall and two side walls that converge towards one another at an angle of at least 20° to thereby define a wedge-shaped cell, the method comprising the steps of:
   feeding raw coffee into the at least one wedge-shaped extractor cell when the at least one extractor cell is positioned in alignment with a first extractor receiving chamber;
   preswelling the raw coffee in the at least one wedge-shaped extractor cell for a predetermined period of time by spraying the raw coffee with a fluid for preswelling; and
   extracting caffeine from the coffee that has been preswollen by successively moving the at least one wedge-shaped extractor cell into alignment with adjacently positioned individual extractor receiving chambers and wetting the coffee in the at least one wedge-shaped extractor cell that has been preswollen with a fluid for extracting caffeine.

14. The method according to claim 13, including the steps of collecting in the extractor receiving chambers caffeine-rich fluid that is produced from wetting the coffee and feeding the caffeine-rich fluid to an adsorber means for adsorbing the caffeine in the caffeine-rich fluid.

15. The method according to claim 14, including the steps of feeding an adsorbent to the adsorber means, preloading the adsorbent by spraying the adsorbent with a preloading fluid that contains ingredients substantially the same as ingredients of the raw coffee that are not to be extracted, and feeding the caffeine-rich fluid to the preloaded adsorbent to remove caffeine from the caffeine-rich fluid.

* * * * *